(12) United States Patent
Shiohara

(10) Patent No.: US 9,841,932 B2
(45) Date of Patent: Dec. 12, 2017

(54) INFORMATION PROCESSING APPARATUS, OUTPUT CONTROL METHOD, AND STORAGE MEDIUM

(75) Inventor: Tetsuya Shiohara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/211,600

(22) Filed: Aug. 17, 2011

(65) Prior Publication Data

US 2012/0050778 A1    Mar. 1, 2012

(30) Foreign Application Priority Data

Aug. 24, 2010  (JP) ................................ 2010-187491

(51) Int. Cl.
*G06F 3/12*       (2006.01)
*H04N 1/00*       (2006.01)
*G06F 17/21*      (2006.01)

(52) U.S. Cl.
CPC ............ *G06F 3/1208* (2013.01); *G06F 3/121* (2013.01); *G06F 3/1256* (2013.01); *G06F 17/217* (2013.01); *H04N 1/00448* (2013.01); *H04N 1/00461* (2013.01); *G06F 3/1274* (2013.01)

(58) Field of Classification Search
USPC ............................................... 358/1.13–1.15
See application file for complete search history.

(56) References Cited

U.S. PATENT DOCUMENTS

| 6,616,359 | B1  |   | 9/2003  | Nakagiri |
| 8,098,395 | B2 | * | 1/2012  | Kitada ............... H04N 1/00244 358/1.1 |
| 2003/0072031 | A1 | * | 4/2003  | Kuwata ............. H04N 1/00137 358/1.15 |
| 2003/0107777 | A1 |   | 6/2003  | Yamade |
| 2005/0131760 | A1 | * | 6/2005  | Manning ............ G06Q 30/0281 705/346 |
| 2005/0149571 | A1 | * | 7/2005  | Jeon .................. G06F 17/30067 |
| 2005/0206953 | A1 |   | 9/2005  | Kujirai |
| 2005/0289460 | A1 | * | 12/2005 | Tomita et al. ................ 715/530 |
| 2007/0070442 | A1 | * | 3/2007  | Ohkubo ....................... 358/451 |
| 2007/0188791 | A1 | * | 8/2007  | Utsunomiya et al. ........ 358/1.13 |
| 2008/0043286 | A1 | * | 2/2008  | Yoshida et al. .............. 358/1.15 |
| 2008/0144119 | A1 | * | 6/2008  | Otake ................ H04N 1/00307 358/296 |
| 2008/0180703 | A1 | * | 7/2008  | Yamada ................ G06F 3/1204 358/1.9 |
| 2008/0239329 | A1 | * | 10/2008 | Kitada et al. .................. 358/1.1 |
| 2009/0265626 | A1 | * | 10/2009 | Suga ............................. 715/274 |

(Continued)

FOREIGN PATENT DOCUMENTS

JP    2001-067347 A    3/2001
JP    2002-183832 A    6/2002

(Continued)

*Primary Examiner* — Kevin Ky
(74) *Attorney, Agent, or Firm* — Canon U.S.A., Inc. IP Division

(57) ABSTRACT

A page included in a preview page is deleted from an output target document. A logical page corresponding to the deleted page and logical pages corresponding to undeleted pages are represented in different formats on a display unit. A preview page representing one of the undeleted pages is displayed on the display unit. The deleted page is restored as an output target page in the output target document.

16 Claims, 8 Drawing Sheets

(56) References Cited

U.S. PATENT DOCUMENTS

| | | | |
|---|---|---|---|
| 2010/0067064 A1* | 3/2010 | Shigehisa | H04N 1/40062 358/403 |
| 2010/0180196 A1* | 7/2010 | Matsusaka | G06F 17/211 715/255 |
| 2010/0306800 A1* | 12/2010 | Jung | H04N 1/00448 725/41 |
| 2011/0055691 A1* | 3/2011 | Carlen | G06F 17/212 715/273 |
| 2011/0096361 A1* | 4/2011 | Aoki | G06F 17/212 358/1.15 |
| 2011/0099501 A1* | 4/2011 | Mull | G06F 3/0482 715/771 |
| 2011/0194135 A1* | 8/2011 | Hamilton et al. | 358/1.14 |
| 2011/0279849 A1* | 11/2011 | Umi | H04N 1/32657 358/1.14 |
| 2012/0042251 A1* | 2/2012 | Rodriguez | G11B 27/034 715/723 |
| 2012/0050778 A1* | 3/2012 | Shiohara | G06F 3/1208 358/1.13 |

FOREIGN PATENT DOCUMENTS

| | | |
|---|---|---|
| JP | 2007-081854 A | 3/2007 |
| JP | 2008-193664 A | 8/2008 |
| JP | 2008-305417 A | 12/2008 |
| JP | 2008-305417 A | 12/2008 |
| WO | 2005/057418 A1 | 6/2005 |

* cited by examiner

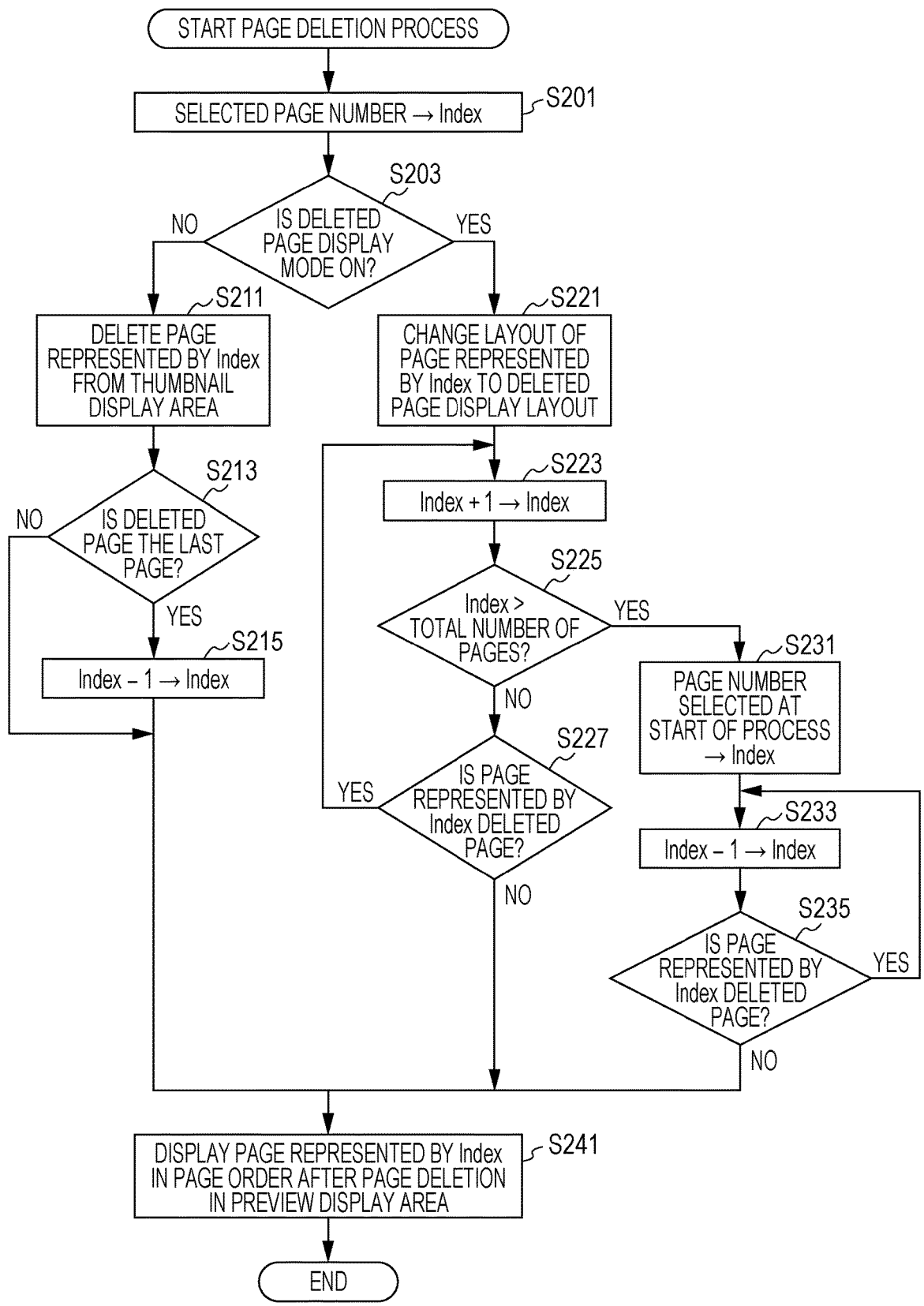

INFORMATION PROCESSING APPARATUS, OUTPUT CONTROL METHOD, AND STORAGE MEDIUM

BACKGROUND OF THE INVENTION

Field of the Invention

The present invention relates to an information processing apparatus, an output control method, and a storage medium.

Description of the Related Art

A printer driver has a print preview function of analyzing print data and print setting information, creating display data (a print image) representing a print result, and displaying the created print image on a display screen before a print command is transmitted to a printer. Examples of such a print preview function include a function of allowing a user to edit a document and change print setting information while checking a print target and a function of allowing a user to delete an unnecessary page of a document (see, for example, Japanese Patent Laid-Open No. 2008-305417).

When a print preview function of allowing a user to delete a page is employed, the user may delete a necessary page by mistake. When the user realizes that the necessary page has been deleted and tries to restore the deleted page, an initialization function of restoring a document to an initial state or an Undo function of undoing the last action is often used. In this case, however, other settings are also restored or the undoing of an action cannot be performed owing to the repetition of the change in setting.

SUMMARY OF THE INVENTION

The present invention provides an information processing apparatus, an output control method, and a storage medium capable of appropriately restoring a deleted page.

An information processing apparatus according to an embodiment of the present invention including a display unit for displaying a preview page representing an output result of an output target document includes a deletion unit configured to delete a page included in the preview page from the output target document in response to a user's operation, a display control unit configured to, when the deletion unit deletes a page, represent a logical page corresponding to the deleted page and logical pages corresponding to undeleted pages in different formats on the display unit, and display, on the display unit, a preview page representing one of the undeleted pages, and a restoration unit configured to restore the deleted page as an output target page in the output target document in response to a user's operation. The display control unit is configured to update the preview page in accordance with the restoring by the restoration unit.

Further features of the present invention will become apparent from the following description of exemplary embodiments with reference to the attached drawings.

BRIEF DESCRIPTION OF THE DRAWINGS

FIG. 5 is a flowchart illustrating an exemplary page deletion process.

DESCRIPTION OF THE EMBODIMENTS

Embodiments of the present invention will be described below with reference to the accompanying drawings. The present invention is not limited to these embodiments. All configurations described in the embodiments are not necessarily needed to solve the above-described difficulty.

First Embodiment

[Operation of Printer Driver]

Figure 1:
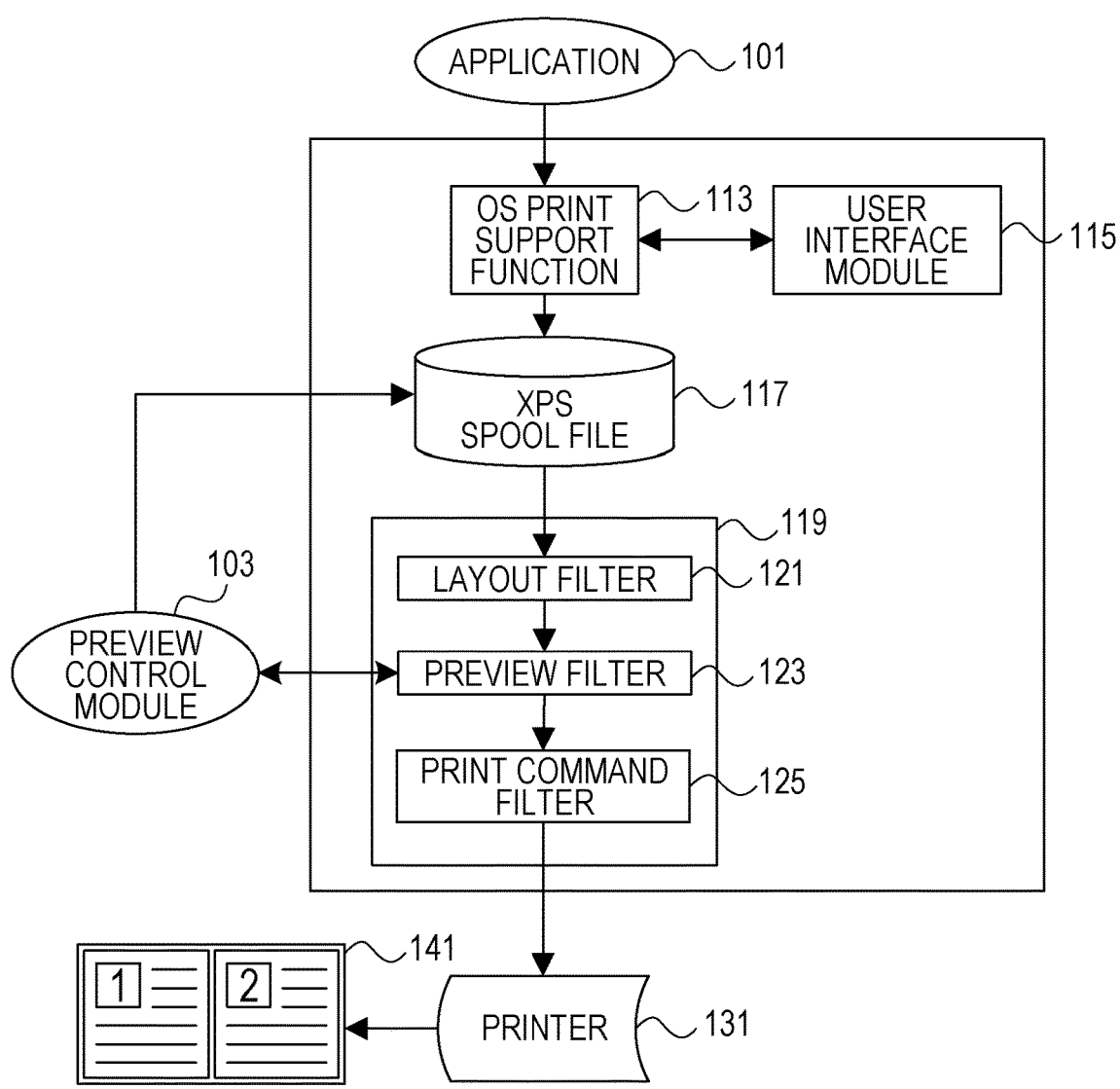
FIG. 1 is a diagram illustrating an exemplary functional configuration of a print system according to an embodiment of the present invention.

FIG. 1 is a diagram illustrating an exemplary functional configuration of a print system according to the first embodiment. In this embodiment, as a printer driver, an XML Paper Specification (XPS) driver for processing XPS print data is used. However, any type of printer driver such as an GDI driver for processing Enhanced Meta File (EMF) data or a printer driver for processing specific-type data may be used.

The function of this print system can be achieved by an information processing apparatus (computer). An information processing apparatus includes an input interface, a CPU, a ROM, a RAM, an external storage, an output interface, and an input/output interface. Input devices such as a keyboard and a mouse are connected to the input interface. The input interface receives an operational signal input by a user with the input device (a user's operation). An output device (an example of a display unit) such as a display is connected to the output interface. The ROM stores an initializing program. The external storage stores application programs, an Operating System (OS), a printer driver, and various pieces of data. For example, the RAM functions as a work memory for various programs stored in the external storage. In this embodiment, the CPU performs processing in accordance with a program stored in the ROM, so that a function to be described later and a process to be described later with reference to a flowchart are realized.

Main modules according to this embodiment are a user interface module 115, a filter group 119, and a preview control module 103. The user interface module 115 has a function of performing various print settings. The filter group 119 includes a layout filter 121, a preview filter 123, and a print command filter 125. The layout filter 121 has a function of laying out pages of an XPS document (hereinafter referred to as a print document) corresponding to XPS data. The layout processing will be described in detail later. The preview filter 123 provides a preview function. The print command filter 125 has a function of converting a print document into a print command interpretable by the printer 131 that is an example of the output device. Here, a filter is a module (program) having a function of receiving data, performing processing such as data processing, conversion, non-conversion, or generation on the received data, and outputting the data.

In this print system, print data of each page of a document created by the application 101 is temporarily stored in an XPS spool file 117 via an OS print support function 113. The filter group 119 reads out the print data from the XPS spool file 117, converts the print data into a print command interpretable by the printer 131 on the basis of print setting information, and supplies the print command to the printer 131. Upon receiving the print command, the printer 131 performs printing. The user interface module 115 generally provides a function of setting the size of a sheet used for printing, a print direction, and other attributes. In addition, the user interface module 115 has a function of performing settings (including the setting of the number of preview pages displayed on a single screen) with which to display a print image (preview page) that is a result of printing before the printer 131 performs a printing operation. The user interface module 115 returns print setting information including setting values of a plurality of print setting items to the application 101.

In the printing of a document created in response to a user's operation, the application 101 notifies the OS print support function 113 of a print start instruction or a print end instruction. Furthermore, the application 101 notifies the OS print support function 113 of print setting information returned from the user interface module 115 and an instruction for starting or ending drawing of each page of a document. The OS print support function 113 stores an image drawn by the application 101 and the print setting information in the XPS spool file 117. The OS print support function 113 invokes each filter to despool a spooled print document as appropriate.

The filter group 119 includes one or more filters. The filter group 119 has a function of reading out a print document from the XPS spool file 117, converting the print document into a print command interpretable by the printer 131, and supplies the print command to the printer 131 for printing. The filter group 119 according to this embodiment includes the layout filter 121 that is an example of a layout processing unit, the preview filter 123 that is an example of a preview document creation unit, and the print command filter 125 that is an example of a print command conversion unit. However, the layout filter 121 and the preview filter 123 may be integrated into a single filter, and an unnecessary filter may be removed. This embodiment is not limited to the above-described filter configuration.

The layout filter 121 has a function of receiving a print document stored in the XPS spool file 117, performing layout processing on pages on the basis of print setting information, and outputting the print document. The layout processing is, for example, processing for placing a plurality of pages on the surface of a single sheet (layout printing processing) or processing for placing a single page on the surfaces of a plurality of sheets (poster printing processing). The preview filter 123 receives the print document and the print setting information from the layout filter 121 and provides a preview function for a user using the preview control module 103. The preview filter 123 determines whether a preview display mode is ON by referring to a setting value in accordance with which a print document is previewed (that is, output control). When it is determined that the preview display mode is ON, the preview filter 123 activates the preview control module 103 and transmits the print document to the preview control module 103 in the form of print data. The preview control module 103 displays a preview of the print document. On the other hand, when it is determined that the preview display mode is OFF, the preview filter 123 determines that the preview of the print document will not be displayed and transmits the print document to the next filter. The processing performed by the preview filter 123 ends after all print documents have been transmitted.

The preview control module 103 can handle a plurality of print documents. When a single print document is added in the preview control module 103, processing for the added print document is not performed and temporarily ends. Subsequently, processing for the next print document is started. Thus, a plurality of print documents can be added in the preview control module 103. When a user checks a preview and inputs an instruction for printing a print document using the input device, the preview control module 103 adds the print document to a print queue. The preview control module 103 turns off the preview display mode for the added print document by changing a preview setting value of the print document. As a result, the preview filter 123 can transmit the print document to the next filter, the print command filter 125, without displaying a preview of the print document again.

The print command filter 125 has a function of receiving a print document from the preview filter 123, converting the print document into a print command interpretable by the printer 131 on the basis of print setting information, and outputting the print command. When the print command filter 125 temporarily converts a received print document into image data, the print command filter 125 is generally called a render filter. The render filter is often used in a printer driver for an inexpensive raster printer such as an inkjet printer. When the print command filter 125 is a render filter, the print command filter 125 temporarily converts a received print document into image data, performs image processing such as color space conversion and binarization on the image data, and converts the image data into a print command interpretable by a raster printer.

When a high-performance printer such as a page printer can interpret an XPS print command, the print command filter 125 edits a received print document and outputs the edited print document. When there is no need for the print command filter 125 to process a received print document, the print command filter 125 may output the received print document without processing it or the print command filter 125 may not be included in a printer driver. The printer 131 has a function of interpreting the print command generated by the print command filter 125 and forming a visible image on a recording sheet. Referring to FIG. 1, on a recording sheet 141, an exemplary result of printing is illustrated. In this example, the layout filter 121 performs processing for laying out two pages on a single recording sheet (so-called 2-up processing).

[Configuration of Preview Window]

Figure 2:
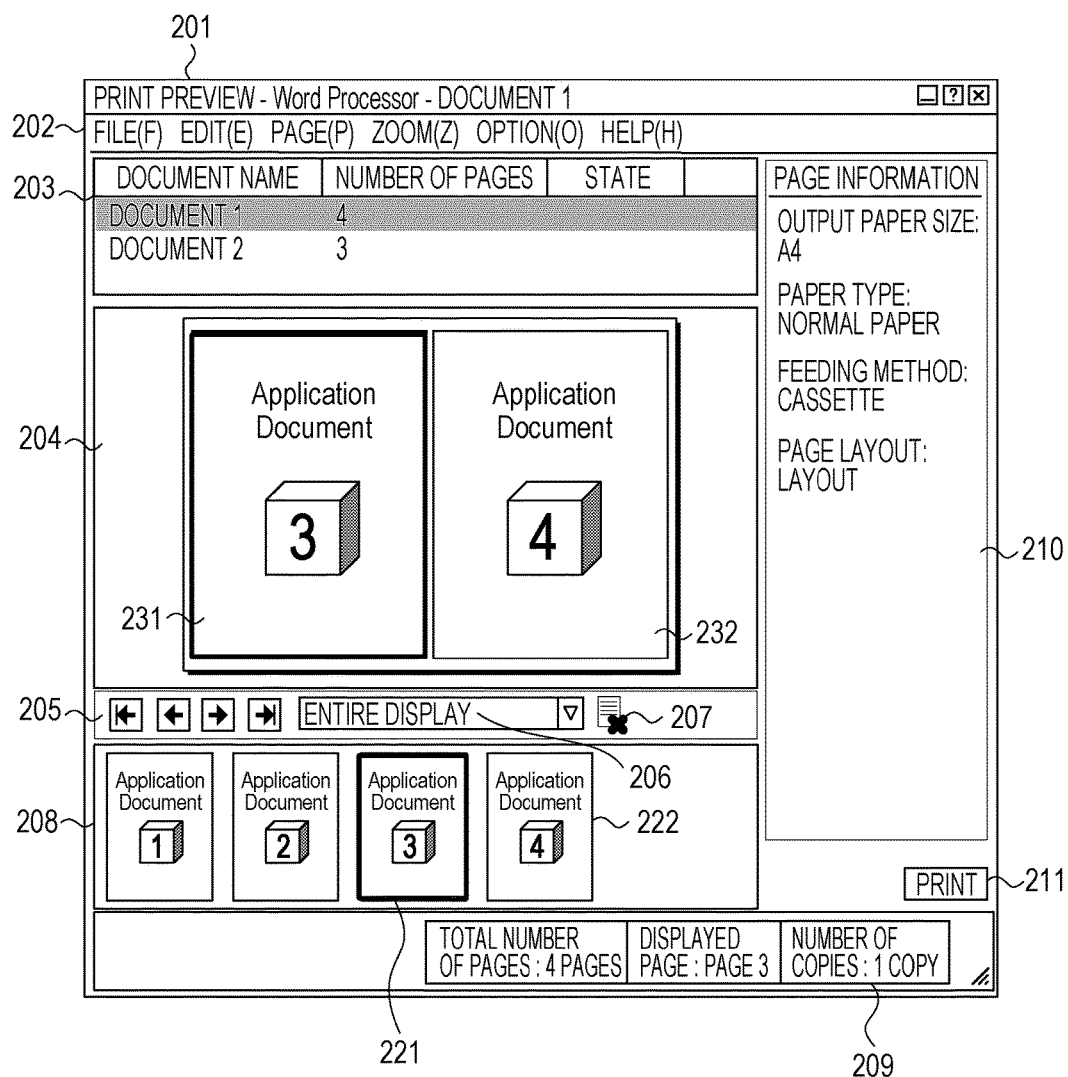
FIG. 2 is a diagram illustrating an example of a preview window.

FIG. 2 is a diagram illustrating an example of a display screen (preview window) created by the preview control module 103. A preview window 201 includes a display area where a print image and the print setting information of a print document are displayed and an input unit allowing a user to change a print image display method. A menu bar 202 displays instructions such as a display screen switching instruction for the preview control module 103 in a menu format. A document list 203 displays a list of print documents that can be processed by the preview control module 103. A print document selected from the document list 203 is a display target or a print target. In a preview display area 204, a recording sheet and a visible image to be formed on the recording sheet on the basis of a print document and print setting information are displayed as a print image.

Buttons 205 to 207, which are examples of a user operation unit, are displayed in a predetermined region in the form of a tool bar. The page display switching button 205 includes four buttons, and is used to switch a print image (displayed image) in the preview display area 204 to a specified page (the top page, the previous page, the next page, or the last page). The zoom button 206 is a drop-down list used to change a display size of a print image, and selects one of the entire display, 100% display, 200% display, etc. in response to a user's operation. The page deletion button 207 is used to delete a page corresponding to a thumbnail (a logical page in a broad sense) selected in a thumbnail display area 208 to remove the page from print targets. A deletion target page corresponds to a logical page selected when the page deletion button 207 is pressed in this embodiment, but is not limited thereto.

In the thumbnail display area 208, logical pages corresponding to all pages of a print document selected in the document list 203 are displayed. In the thumbnail display area 208, thumbnails (logical pages) on which layout processing is not performed on the basis of print setting information are displayed. By selecting one of the logical pages displayed in the thumbnail display area 208, a displayed page can be changed. The display and non-display of the thumbnail display area 208 can be switched. In a setting display area 209, the setting values of typical print setting items set for a print document selected in the document list 203 are displayed. In this example, the total number of pages of the print document is 4 pages, the page number of the selected page is 3, and the number of copies to be printed is 1. In a page information display area 210, the setting values of typical print setting items set for a displayed page are displayed. The preview control module 103 can not only display setting values but also provide a function of changing these setting values. When a print button 211 is pressed by a user via the input device, the printing of the print document selected in the document list 203 is started.

[Display of Deleted Page]

The preview control module 103 has a function of allowing a user to delete an unnecessary page while checking a print document in the preview display area 204. In addition, the preview control module 103 has a function of restoring the deleted page as a print target. A mechanism for displaying a logical page corresponding to a deleted page to allow a user to specify the deleted page as a restoration target will be described.

Figure 3A:
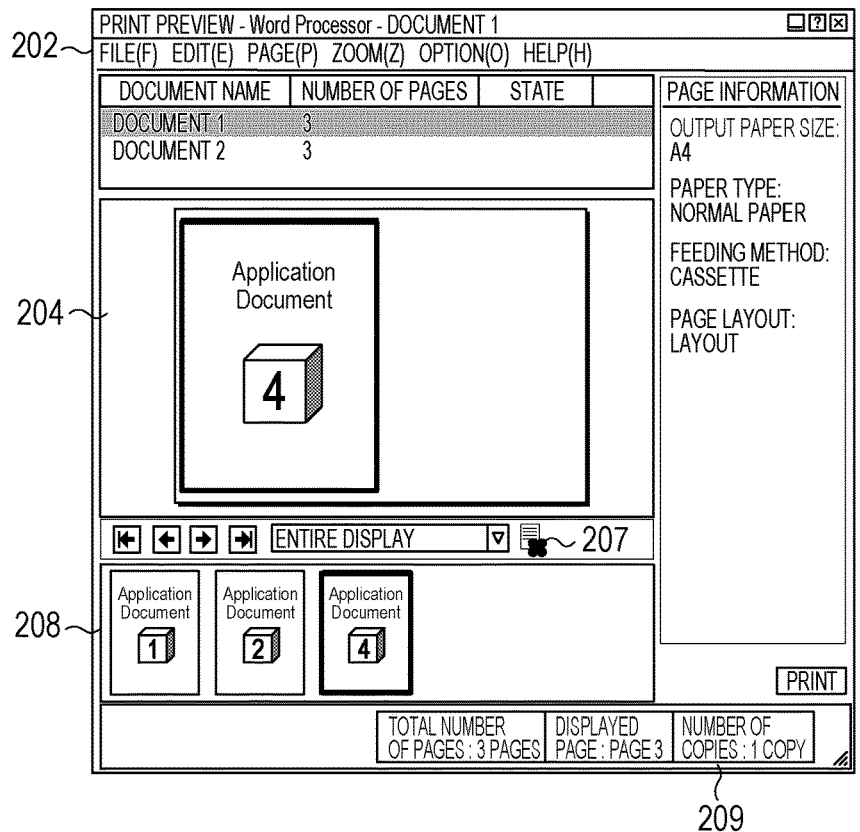
FIGS. 3A and 3B are diagrams illustrating examples of a preview window.
Figure 3B:
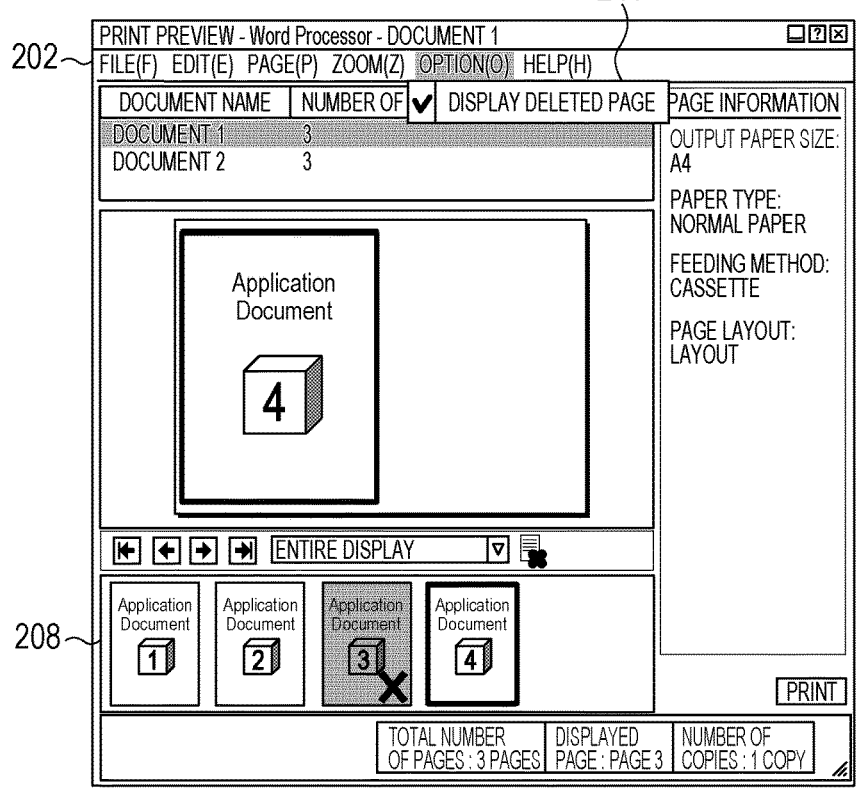

FIG. 3B is a diagram that illustrates an example of a display screen and describes a method of displaying a deleted page. A user can turn on or off the display of a deleted page by pressing a menu item of "display deleted page" included in an option menu in the menu bar 202 with the input device. When the display of a deleted page is in an ON state, the menu item is check-marked. When the display of a deleted page is turned on, a deleted page is displayed in the thumbnail display area 208. In order to allow a user to visually check the deleted page displayed in the thumbnail display area 208, the layout (display format) of the deleted page is changed. For example, the deleted page becomes translucent or is marked with a cross. The deleted page is displayed in only the thumbnail display area 208, and a print image corresponding to the deleted page is not displayed in the preview display area 204. As a result, in the case of, for example, the print document illustrated in FIG. 3B for which layout printing is set, the occurrence of a phenomenon in which the layout of print images displayed in the preview display area 204 differs from that of printed images can be prevented.

Figure 4:
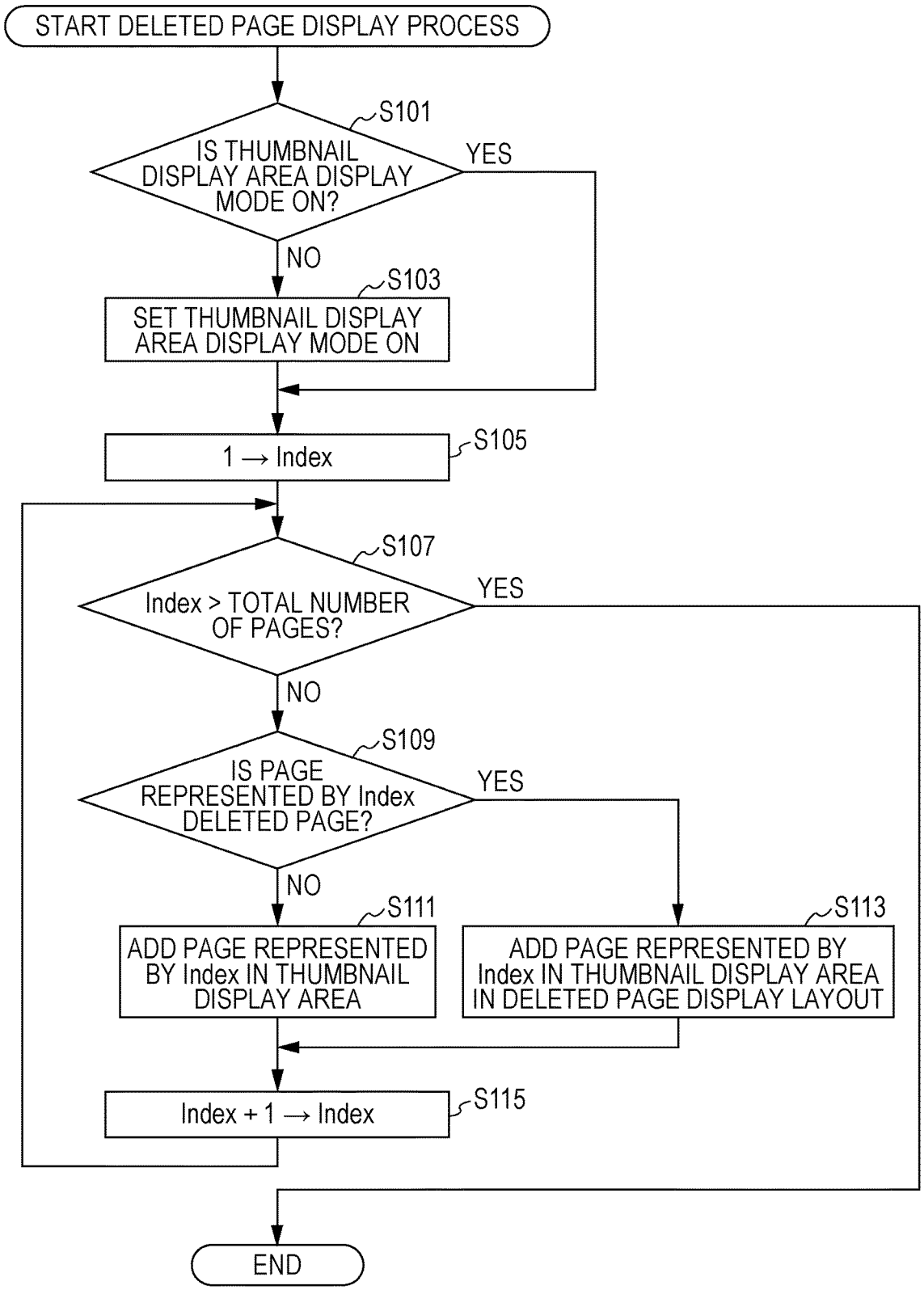
FIG. 4 is a flowchart illustrating an exemplary deleted page display process.

FIG. 4 is a flowchart illustrating an exemplary deleted page display process. In step S101, the preview control module 103 determines whether a thumbnail display area display mode is ON by referring to a setting value in accordance with which the thumbnail display area 208 is displayed (a display area setting value). When the preview control module 103 determines that the thumbnail display area display mode is OFF, the process proceeds to step S103. On the other hand, when the preview control module 103 determines that the thumbnail display area display mode is ON, the process proceeds to step S105. In step S103, the preview control module 103 turns on the thumbnail display area display mode by changing the display area setting value. The thumbnail display area 208 is displayed and the process proceeds to step S105. This processing is performed to allow a user to visually check a deleted page that is displayed in only the thumbnail display area 208.

In the process from step S105 to step S115, the preview control module 103 updates the thumbnail display area 208. In step S105, the preview control module 103 sets Index representing a logical page to be processed (a target page) to 1. The process proceeds to step S107. In step S107, the preview control module 103 determines whether Index exceeds the total number of logical pages of a print document. The total number of logical pages of a print document includes a deleted page. When the preview control module 103 determines that Index is smaller than the total number of logical pages of the print document and there is an unprocessed logical page, the process proceeds to step S109. On the other hand, when the preview control module 103 determines that Index is larger than the total number of logical pages of the print document and all logical pages have already been processed, the deleted page display process ends.

In step S109, the preview control module 103 determines whether the target page is a deleted page. When the preview control module 103 determines that the target page is not a deleted page, the process proceeds to step S111. On the other hand, when the preview control module 103 determines that the target page is a deleted page, the process proceeds to step S113. In order to determine whether the target page is a deleted page, for example, the preview control module 103 refers to a flag that is added to a logical page of a print document and indicates whether the logical page is a deleted page. However, another method may be employed. For example, a file for managing information about the relationship between a logical page of a print document and the presence of a deleted page may be made, and the preview control module 103 may use the file for determination. Thus, any deleted page determination method may be employed.

In step S111, the preview control module 103 adds the target page in the thumbnail display area 208. The process proceeds to step S115. In step S113, the preview control module 103 changes the layout of the target page to a deleted page display layout and adds the target page in the thumbnail display area 208. The process proceeds to step S115. The deleted page display layout is obtained by, for example, making a deleted page translucent or adding a cross to the deleted page as described previously, but may be obtained by another method. In step S115, in order to set the next logical page as a target page, the preview control module 103 adds 1 to Index. The process returns to step S107. The preview control module 103 repeatedly performs the process from step S107 to step S115. When the preview control module 103 determines that all logical pages have already been processed, the deleted page display process ends.

[Deletion of Page]

As described previously, the preview control module 103 has a function of deleting a page corresponding to a logical page that has been removed from print targets by a user. A user presses the page deletion button 207 while selecting a logical page corresponding to a deletion target page using the input device, thereby deleting the deletion target page.

Instead of the page deletion button 207, a page deletion item may be included in an edit menu in the menu bar 202.

FIG. 3A is a diagram illustrating an exemplary state after a page 231 corresponding to a third logical page 221 has been deleted when the deleted page display mode is OFF in the preview window 201 illustrated in FIG. 2. In the thumbnail display area 208, the third logical page 221 is hidden and a fourth logical page 222 is displayed as the third page and is set as the selected page. With the change in the selected page, a display update is performed on the preview display area 204. Since layout printing is set for the selected print document illustrated in FIGS. 2 and 3A, the page 231 is deleted and a page 232 is moved and displayed in the preview display area 204. When layout printing is not set for the selected print document, only the page 231 is displayed before deletion of the page 231 and only the page 232 is displayed after the deletion.

FIG. 3B is a diagram illustrating an exemplary state after the page 231 corresponding to the third logical page 221 has been deleted when the deleted page display mode is ON in the preview window 201 illustrated in FIG. 2. In the thumbnail display area 208, the layout of the logical page 221 corresponding to the deleted page 231 is changed to a deleted page display layout. In the preview display area 204, the same page as that displayed when the deleted page display mode is OFF, that is, a page that follows the deleted page, is displayed. Regardless of whether the deleted page display mode is ON or OFF, the same display update is performed on the preview display area 204.

FIG. 5 is a flowchart illustrating an exemplary page deletion process. In step S201, the preview control module 103 sets Index representing a selected page to a number of the selected page. The process proceeds to step S203. In step S203, the preview control module 103 determines whether the deleted page display mode is ON by referring to a setting value in accordance with which a deleted page is displayed (a deleted page setting value). When the preview control module 103 determines that the deleted page display mode is OFF, the process proceeds to step S211. On the other hand, when the preview control module 103 determines that the deleted page display mode is ON, the process proceeds to step S221.

The process from step S211 to step S215 is an example of a page deletion process performed when a deleted page is not displayed. In step S211, the preview control module 103 hides the selected page (removes the selected page from the thumbnail display area 208). The process proceeds to step S213. In step S213, the preview control module 103 determines whether the deleted page (the selected page) is the last page. When the preview control module 103 determines that the deleted page is the last page, the process proceeds to step S215. On the other hand, when the preview control module 103 determines that the deleted page is not the last page, the process proceeds to step S241.

In step S215, the preview control module 103 subtracts 1 from Index. After the deletion of a page having a page number, a new page having the same page number is usually displayed. However, after the last page has been deleted, there is no new page having the same page number. Accordingly, the processing of step S215 is performed to display the previous page. The process proceeds to step S241. In step S241, the preview control module 103 performs a display update on the preview display area 204 in accordance with Index. The page deletion process ends. For example, the preview control module 103 displays a page of a print image corresponding to a logical page immediately after the deleted logical page displayed in the thumbnail display area 208. The processing for generating (for example, laying out) a print image to be displayed in accordance with Index is performed by the preview control module 103.

The process from step S221 to step S235 is an example of a page deletion process performed when a deleted page is displayed. In step S221, the preview control module 103 changes the layout of the selected page to a deleted page display layout. The process proceeds to step S223. In the process from step S223 to step S227, the preview control module 103 retrieves a logical page corresponding to the next undeleted page that follows the deleted page and set the retrieved logical page as a selected page. This process is performed to display the same page as that displayed when the deleted page display mode is OFF in the preview display area 204 after the page deletion. In step S223, the preview control module 103 adds 1 to Index representing the selected page. The process proceeds to step S225. In step S225, the preview control module 103 determines whether Index exceeds the total number of logical pages of the print document. When the preview control module 103 determines that Index does not exceed the total number of logical pages of the print document, the process proceeds to step S227. On the other hand, when the preview control module 103 determines that Index exceeds the total number of logical pages of the print document, the process proceeds to step S231.

In step S227, the preview control module 103 determines whether the logical page represented by Index is a deleted page. When the preview control module 103 determines that the logical page represented by Index is not a deleted page, the preview control module 103 sets the logical page as a selected page. The process proceeds to step S241. On the other hand, when the preview control module 103 determines that the logical page represented by Index is a deleted page, the process returns to step S223. Retrieval is repeatedly performed until an undeleted logical page is found or the number (Index) of a retrieved logical page exceeds the total number of logical pages of the print document. When the preview control module 103 determines that the number of a retrieved logical page exceeds the total number of logical pages of the print document, the process proceeds to step S231.

In the process from step S231 to step S235, the preview control module 103 retrieves a logical page corresponding to an undeleted page that precedes the deleted page. In step S231, the preview control module 103 sets the number of the selected page (the number of the logical page corresponding to the deleted page) as Index. The process proceeds to step S233. In step S233, the preview control module 103 subtracts 1 from Index. The process proceeds to step S235. In step S235, the preview control module 103 determines whether a logical page represented by Index is a deleted page. When the preview control module 103 determines that a logical page represented by Index is not a deleted page, the process proceeds to step S241. On the other hand, when the preview control module 103 determines that a logical page represented by Index is a deleted page, the process returns to step S233. The process from step S233 to step S235 is repeated until a logical page corresponding to an undeleted page is retrieved. In step S241, the preview control module 103 performs a display update on the preview display area 204 in accordance with Index. The page deletion process ends. For example, the preview control module 103 displays a page of a print image corresponding to a logical page immediately after the deleted logical page.

[Restoration of Page]

In this embodiment, when a user specifies a deleted page displayed in the thumbnail display area 208 using the input device and inputs an instruction for restoring the specified deleted page, a page corresponding to the specified deleted page can be set as a print target again. When the deleted page, which is displayed in only the thumbnail display area 208, is specified, the specified page is not displayed in the preview display area 204. In the preview display area 204, for example, the currently displayed page is continuously displayed. However, another configuration may be used. At the time of selection of the deleted page, the selected page and the page displayed in the preview display area 204 differ from each other. Accordingly, when the preview control module 103 has a function of editing a print document and edits the selected deleted page, a user cannot check the edit performed on the selected deleted page in the preview display area 204. In this embodiment, at the time of the selection of a deleted page, all edits except for page restoration or edits performed on individual pages are therefore prohibited (rejected).

Figure 6A:
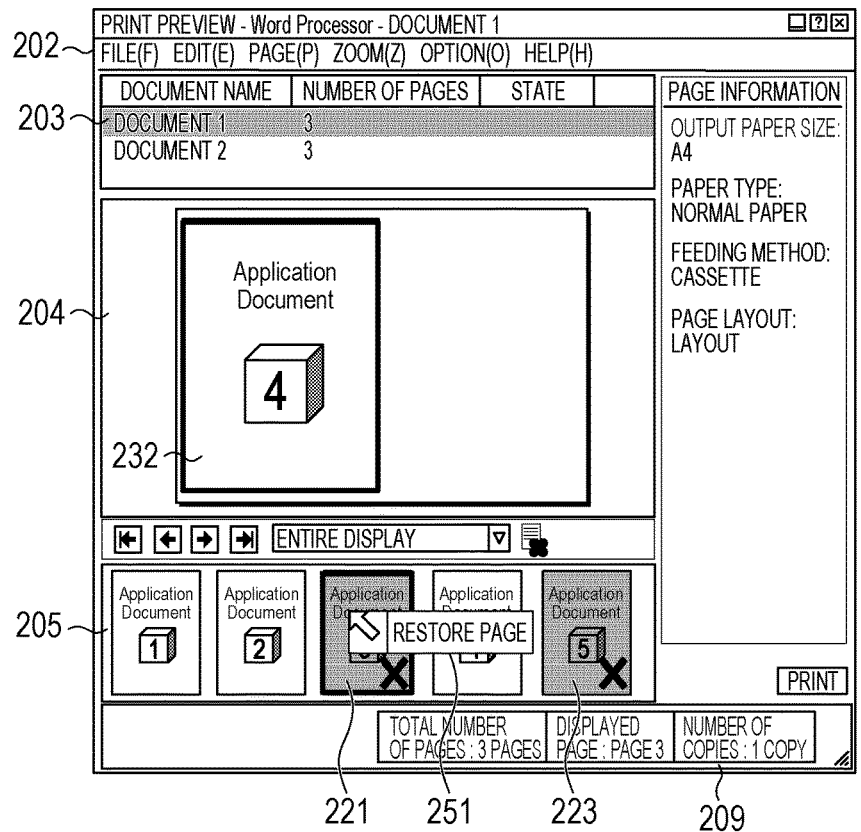
FIGS. 6A and 6B are diagrams illustrating examples of a preview window.
Figure 6B:
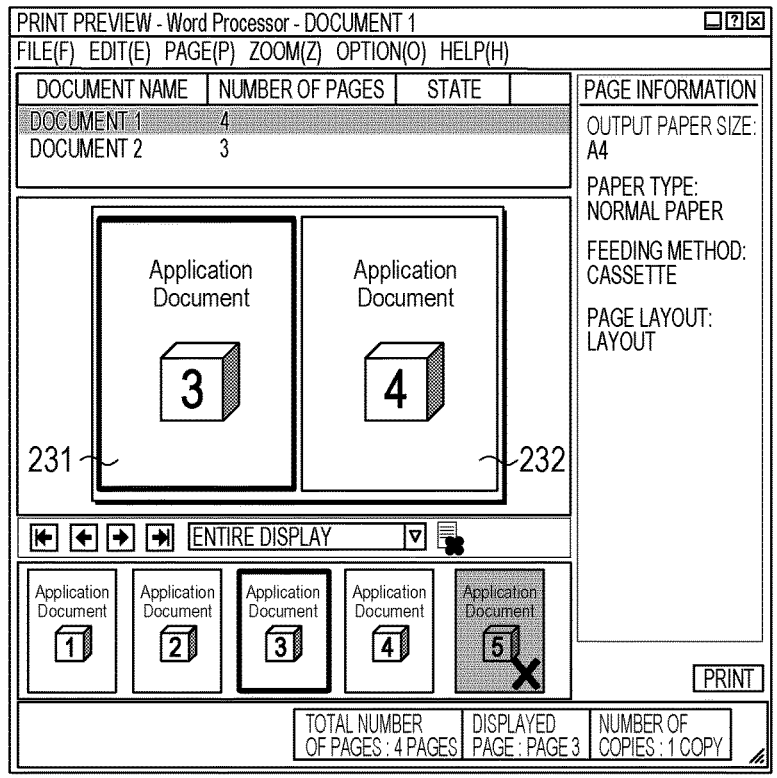

FIGS. 6A and 6B are diagrams illustrating examples of a display screen and describing a page restoration method. FIG. 6A illustrates an exemplary case in which pages corresponding to the third logical page 221 and a fifth logical page 223 are deleted from a print document having five pages. When a page corresponding to the logical page 221 is restored, a user specifies the logical page 221 that is a deleted page by, for example, moving a mouse cursor over the logical page 221 in the thumbnail display area 208 and clicking. Another page specification method may be used. When the logical page 221 is specified, a display update is performed on the logical page 221 to make the currently selected page identifiable. For example, a box is drawn around the logical page 221.

Next, when a right mouse button is clicked over the logical page 221 in a state in which the logical page 221 is selected, a context menu 251 appears. Alternatively, when a right mouse button is clicked over the logical page 221, the selection of the logical page 221 and the display of the context menu 251 may be performed at the same time. When "restore page" is selected in the context menu 251, the page 231 corresponding to the logical page 221 is set as a print target page again. The context menu 251 is used for page restoration in this embodiment, but another configuration may be employed. For example, a menu item of "restore page" may be included in the edit menu in the menu bar 202 or a page restoration button may be created.

FIG. 6B is a diagram illustrating an example of a display screen after the page 231 corresponding to the logical page 221 has been restored. In the thumbnail display area 208, the logical page 221 is displayed in a normal logical page display layout changed from the deleted page display layout. In the preview display area 204, a layout-processed print image including the page 231 is displayed. For the print document illustrated in FIGS. 6A and 6B, 2-in-1 layout printing is set. Accordingly, the third page and the fourth page are placed on a single recording sheet. Referring to FIG. 6A, since the page 231 corresponding to the logical page 221 is deleted, only the page 232 is placed in the preview display area 204. Referring to FIG. 6B, since the page 231 corresponding to the logical page 221 is restored, the page 231 corresponding to the logical page 221 in the thumbnail display area 208 is displayed in the preview display area 204. Thus, a display update is performed on the preview display area 204 so that the pages 231 and 232 are placed on a single recording sheet. The item of "number of pages" in the document list 203 and the item of "total number of pages" in the setting display area 209 reflect the number of pages increased at the time of page restoration.

Figure 7:
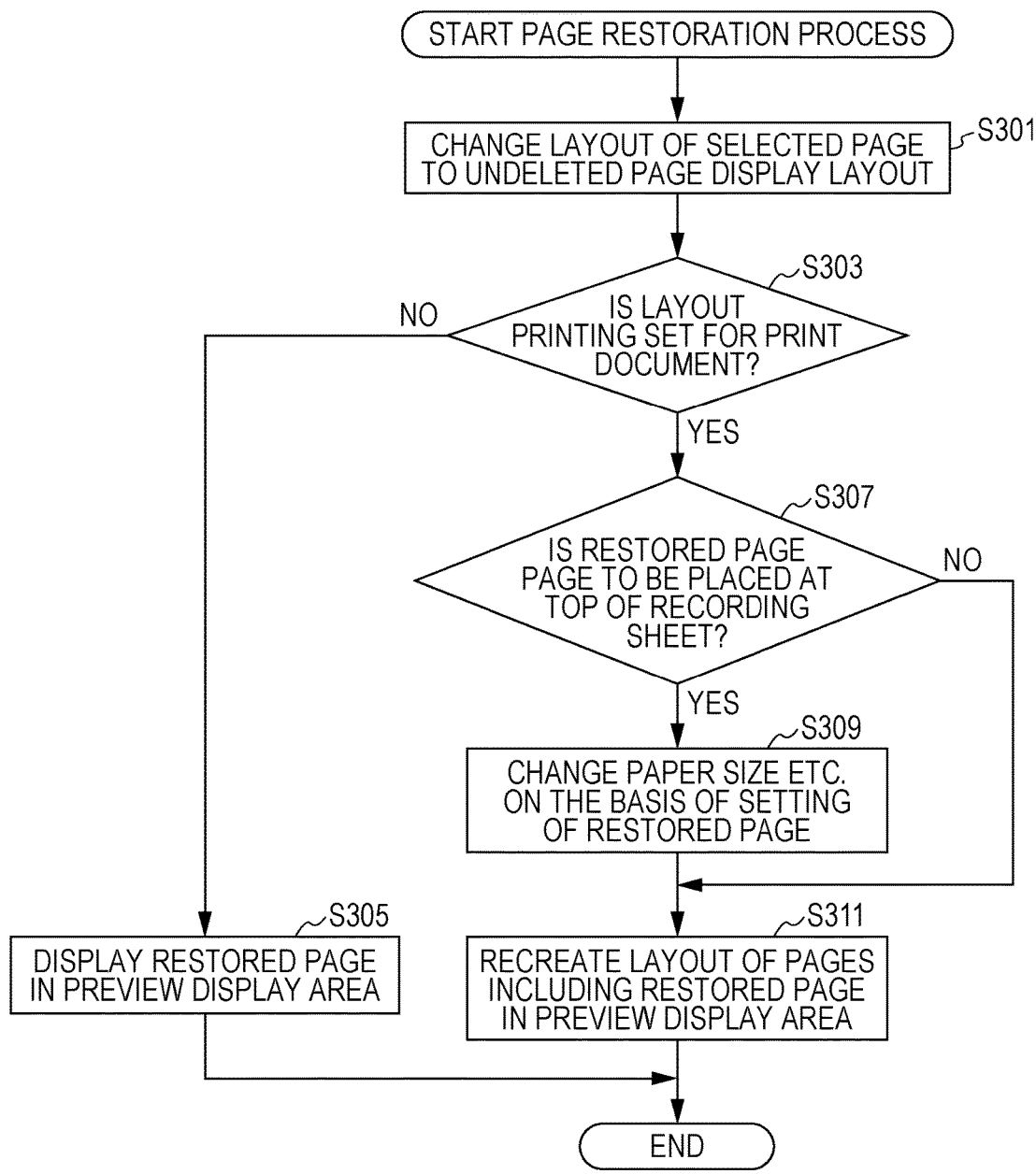
FIG. 7 is a flowchart illustrating an exemplary page restoration process.

FIG. 7 is a flowchart illustrating an exemplary page restoration process. In step S301, the preview control module 103 changes the layout of a selected page to a normal layout for a logical page that is not a deleted page. The process proceeds to step S303. In step S303, the preview control module 103 determines whether layout printing is set for a print document to be processed. When the preview control module 103 determines that layout printing is not set for the print document to be processed, the process proceeds to step S305. On the other hand, when the preview control module 103 determines that layout printing is set for the print document to be processed, the process proceeds to step S307. In step S305, the preview control module 103 sets a logical page corresponding to a restored page as a new selected page and displays the restored page in the preview display area 204. Subsequently, the page restoration process ends. At that time, processing for generating a print image including the restored page is performed by the preview control module 103.

In the process from step S307 to step S311, the preview control module 103 updates the layout of the print document including the restored page for which layout printing is set. In step S307, the preview control module 103 determines whether the restored page is a page to be placed at the top of a recording sheet. In the case of a print document for which 4-in-1 layout printing is set, the first page and the fifth page of the print document are pages to be placed at the top of a recording sheet. When the preview control module 103 determines that the restored page is a page to be placed at the top of a recording sheet, the process proceeds to step S309. When the preview control module 103 determines that the restored page is not a page to be placed at the top of a recording sheet, the process proceeds to step S311.

In step S309, the preview control module 103 updates the setting of a recording sheet on the basis of print setting information of the restored page. The size and type of a recording sheet can be set for each page. However, in the case of a print document for which layout printing is set, since a plurality of pages are placed on a single recording sheet, different setting values of all pages included in the print document cannot be reflected in a result of printing. In this embodiment, the setting value of a page placed at the top of a recording sheet is employed as the setting value of the recording sheet. For example, when 2-in-1 layout printing is set for a print document having a A4-size first page and an L-size second page, the setting value of the first page, that is, A4, is employed and two pages are placed on a A4-size recording sheet. Accordingly, when a page to be placed at the top of each recording sheet is changed after page restoration, the preview control module 103 updates the setting of the recording sheet on the basis of a new reference page. Subsequently, the process proceeds to step S311. The same processing is performed after a page has been deleted, and the description thereof will be therefore omitted.

In step S311, the preview control module 103 recreates the layout of the print image including the restored page. Since the restored page is a display target, the print image including the restored page is displayed in the preview display area 204. The preview control module 103 performs processing for generating a print image except for the print image including the restored page at the appropriate time in the page restoration process or a page display switching process.

[Page Display Switching]

As described previously, a deleted page is displayed in only the thumbnail display area 208. Accordingly, at the time of page display switching, when movement target pages include a deleted page, a display state in the preview display area 204 may not be changed. In particular, when the display of the thumbnail display area 208 is OFF, a user doesn't know the reason why the display state in the preview display area 204 is not changed. Accordingly, when page display switching in which a deleted page is not directly specified, that is, page display switching performed by pressing the page display switching button 205 or page display switching performed using a menu item of page display switching, is performed, a deleted page is removed from page display switching targets and then page display switching is performed. When page display switching is performed by clicking over a page displayed in the thumbnail display area 208 using a mouse or the like, a deleted page is not removed from page display switching targets.

Figure 8:
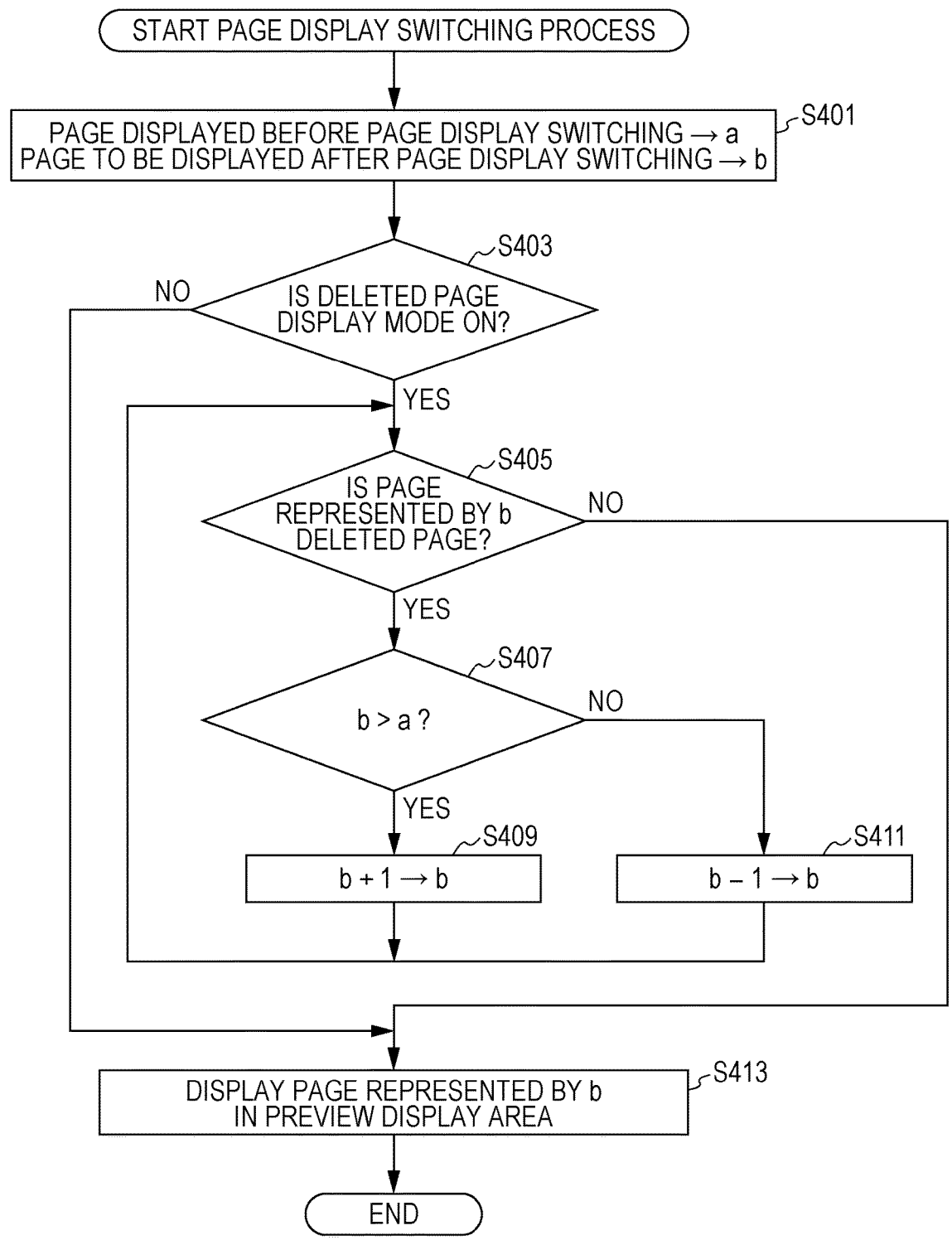
FIG. 8 is a flowchart illustrating an exemplary page display switching process.

FIG. 8 is a flowchart illustrating an exemplary page display switching process. In this example, layout printing is not set for a print document. In step S401, the preview control module 103 stores a logical page number a of a page displayed before page display switching and a logical page number b of a page to be displayed after page display switching. The process proceeds to step S403. For example, when page display switching is performed with the page display switching button 205, a logical page number of 1 is stored when the first page is selected and a logical page number obtained by subtracting 1 from the logical page number of a currently displayed page is stored when the previous page is selected.

In step S403, the preview control module 103 determines whether the deleted page display mode is ON by referring to the deleted page setting value. When the preview control module 103 determines that the deleted page display mode is ON, the process proceeds to step S405. On the other hand, when the preview control module 103 determines that the deleted page display mode is OFF, the process proceeds to step S413. In step S405, the preview control module 103 determines whether the logical page represented by the logical page number b is a deleted page. When the preview control module 103 determines that the logical page represented by the logical page number b is a deleted page, the process proceeds to step S407. On the other hand, when the preview control module 103 determines that the logical page represented by the logical page number b is not a deleted page, the process proceeds to step S413. In step S407, the preview control module 103 determines whether the page to be displayed after page display switching precedes or follows the page displayed before page display switching. When the preview control module 103 determines that the page to be displayed after page display switching follows the page displayed before page display switching, the process proceeds to step S409. On the other hand, when the preview control module 103 determines that the page to be displayed after page display switching precedes the page displayed before page display switching, the process proceeds to step S411.

In step S409, the preview control module 103 adds 1 to the logical page number b to retrieve an undeleted page from the following pages. Subsequently, the process returns to step S405. In step S411, the preview control module 103 subtracts 1 from the logical page number b to retrieve an undeleted page from the preceding pages. Subsequently, the process returns to step S405. The preview control module 103 repeatedly performs the process from step S405 to step S411 to retrieve a logical page corresponding to an undeleted page, and the process proceeds to step S413 when a logical page corresponding to an undeleted page is found. In step S413, the preview control module 103 performs a display update on the preview display area 204 on the basis of the determined logical page number b. That is, when the preview control module 103 determines that the deleted page display mode is ON by referring to the deleted page setting value, it sequentially checks logical pages of a print document starting from a logical page to be displayed after page display switching to retrieve a logical page corresponding to an undeleted page. The preview control module 103 displays a print image corresponding to the retrieved logical page in the preview display area 204.

In this embodiment, page display switching can be performed only when there is an undeleted page to be displayed after the page display switching. For example, when there is no page (there is only a deleted page) that follows the currently displayed page, page display switching to the next page or the last page cannot be performed. In this case, the page display switching button 205 is graded out and becomes unavailable.

According to the above-described configuration, a preview and a deleted page are separately displayed. Even in the case of a print document for which layout printing (placement of a plurality of pages on a single recording sheet) is set, a user can restore a deleted page while checking a preview showing a result of actual printing.

[Other Embodiments]

The present invention can also be realized in such a manner that software (a program) for implementing the function of the above-described embodiment is supplied to a system or an apparatus via a network or from a computer-readable storage medium of various types storing the program and a computer (or a CPU or MPU) of the system or apparatus reads out the program and executes. Accordingly, a computer-readable storage medium storing such a control program can be loaded into a computer, whereby the program is executed causing the computer to carry out the present invention.

According to an embodiment of the present invention, it is possible to more appropriately restore a deleted page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187491 filed Aug. 24, 2010, which is hereby incorporated by reference herein in its entirety.

What is claimed is:

1. An information processing apparatus comprising:
a memory; and
a processor in communication with the memory, the processor configured to control:
a display unit configured to display logical pages in a first area according to a first range of pages and display a print image to show a print output result for a plurality of pages on which print settings are reflected in a second area according to a second range of pages, the plurality of pages corresponding to the logical pages respectively;
a selection unit configured to select a logical page from the logical pages in the first area;
a deletion unit configured to delete the selected logical page from a print target; and a display control unit configured to control the display unit to include a page corresponding to the deleted logical page in the first range of pages and exclude the page corresponding to the deleted logical page from the second range of pages, wherein when the selected logical page is not deleted by the deletion unit, the display unit displays the selected logical page in the first area, and concurrently displays, in the second area, a first print image to show a print output result for the plurality of pages, on which the print settings are reflected, including a page corresponding to the selected logical page, wherein when the selected logical page is deleted by the deletion unit, the display unit displays the deleted logical page in the first area as a deleted page, and concurrently displays, in the second area, a second print image to show a print output result for the plurality of pages, on which the print settings are reflected, in which the page corresponding to the deleted logical page is excluded by the display control unit, and wherein when the selected logical page is deleted by the deletion unit, the second range of pages from which the page corresponding to the deleted logical page is excluded is smaller than the first range of pages.

2. The information processing apparatus according to claim 1 wherein the processor is further configured to control a reception unit configured to receive an instruction from a user whether or not to display the deleted page, wherein the display unit displays the deleted page in the first area in a case where the reception unit has received the instruction to display the deleted page, and controls not to display the deleted page in the first area in a case where the reception unit has received the instruction not to display the deleted page.

3. The information processing apparatus according to claim 1, wherein the processor is further configured to control a restoration unit configured to restore a logical page selected from deleted logical pages to the print target, wherein, in a case where the logical page selected from the deleted logical pages is restored by the restoration unit, the display unit displays a third print image to show a print output result for the plurality of pages, including a page corresponding to the restored logical page, on which the print settings are reflected.

4. The information processing apparatus according to claim 3 wherein the processor is further configured to control a prohibition unit configured to prohibit any edition other than the restoration of the deleted logical pages by the restoration unit, while any one of the deleted logical pages are selected.

5. The information processing apparatus according to claim 1, wherein the processor is further configured to control a setting unit configured to perform print setting, wherein the display unit performs layout processing on the basis of the print setting performed by the setting unit, and displays, by performing the layout processing, the plurality of pages in an area expressing a surface of a sheet in the second area.

6. The information processing apparatus according to claim 5, wherein the display unit displays, as the second print image in a case where the selected logical page is deleted by the deletion unit, the plurality of pages not including the page corresponding to the deleted logical page by moving a next page corresponding to a next logical page of the deleted logical page to fill a space generated according to the deletion of the selected logical page.

7. The information processing apparatus according to claim 1, wherein the display unit displays a list of documents and a logical page and a print image corresponding to a document selected by a user from among the documents in the list.

8. An information processing method comprising:

displaying, on a display unit, logical pages in a first area according to a first range of pages and a print image to show a print output result for a plurality of pages on which print settings are reflected in a second area according to a second range of pages, the plurality of pages corresponding to the logical pages respectively;

selecting a logical page from the logical pages in the first area;

deleting the selected logical page from a print target; and controlling the display unit to include a page corresponding to the deleted logical page in the first range of pages and exclude the page corresponding to the deleted logical page from the second range of pages, wherein when the selected logical page is not deleted in the deleting, the display unit displays the selected logical page in the first area, and concurrently displays, in the second area, a first print image to show a print output result for the plurality of pages, on which the print settings are reflected, including a page corresponding to the selected logical page, wherein when the selected logical page is deleted by the deleting, the display unit displays the deleted logical page in the first area as a deleted page, and concurrently displays, in the second area, a second print image to show a print output result for the plurality of pages, on which the print settings are reflected, in which the page corresponding to the deleted logical page is excluded, and wherein when the selected logical page is deleted by the deleting, the second range of pages from which the page corresponding to the deleted logical page is excluded is smaller than the first range of pages.

9. The information processing method according to claim 8 further comprising:

receiving an instruction from a user whether or not to display the deleted page, wherein the displaying step displays the deleted page in the first area in a case where the receiving step has received the instruction to display the deleted page, and controls not to display the deleted page in the first area in a case where the receiving step has received the instruction not to display the deleted page.

10. The information processing method according to claim 8, further comprising:

restoring a logical page selected from deleted logical pages to the print target, wherein, in a case where the logical page selected from the deleted logical pages is restored, the display unit displays a third print image to show a print output result for the plurality of pages, including a page corresponding to the restored logical page, on which the print settings are reflected.

11. The information processing method according to claim 10 further comprising prohibiting any edition other than the restoration of the deleted logical pages by the restoring, while any one of the deleted logical pages are selected.

12. The information processing method according to claim 8, further comprising print setting, wherein the display unit performs layout processing on the basis of the print setting, and displays, by performing the layout processing, the plurality of pages in an area expressing a surface of a sheet in the second area.

13. The information processing method according to claim 12, wherein the display unit displays, as the second print image in a case where the selected logical page is deleted, the plurality of pages not including the page corresponding to the deleted logical page by moving a next page corresponding to a next logical page of the deleted logical page to fill a space generated according to the deletion of the selected logical page.

14. The information processing method according to claim 8, wherein the display unit displays a list of documents and a logical page and a print image corresponding to a document selected by a user from among the documents in the list.

15. A non-transitory computer-readable storage medium storing a control program, which when loaded into a computer and executed causes the computer to carry out a method comprising:
- displaying, on a display unit, logical pages in a first area according to a first range of pages and a print image to show a print output result for a plurality of pages on which print settings are reflected in a second area according to a second range of pages, the plurality of pages corresponding to the logical pages respectively;
- selecting a logical page from the logical pages in the first area;
- deleting the selected logical page from a print target; and
- controlling the display unit to include a page corresponding to the deleted logical page in the first range of pages and exclude the page corresponding to the deleted logical page from the second range of pages,
- wherein when the selected logical page is not deleted in the deleting, the display unit displays the selected logical page in the first area, and concurrently displays, in the second area, a first print image to show a print output result for the plurality of pages, on which the print settings are reflected, including a page corresponding to the selected logical page,
- wherein when the selected logical page is deleted by the deleting, the display unit displays the deleted logical page in the first area as a deleted page, and concurrently displays, in the second area, a second print image to show a print output result for the plurality of pages, on which the print settings are reflected, in which the page corresponding to the deleted logical page is excluded, and
- wherein when the selected logical page is deleted by the deleting, the second range of pages from which the page corresponding to the deleted logical page is excluded is smaller than the first range of pages.

16. The non-transitory computer-readable storage medium according to claim 15, further comprising:
- receiving an instruction from a user whether or not to display the deleted page,
- wherein the displaying step displays the deleted page in the first area in a case where the receiving step received the instruction to display the deleted page, and controls not to display the deleted page in the first area in a case where the receiving step received the instruction not to display the deleted page.

* * * * *